K. L. HANSON.
FURROW OPENER FOR CORN PLANTERS.
APPLICATION FILED MAY 18, 1912.

1,108,435.

Patented Aug. 25, 1914.

Witnesses

Inventor
Karl L. Hanson
By
Attorney

UNITED STATES PATENT OFFICE.

KARL L. HANSON, OF HERMAN, NEBRASKA.

FURROW-OPENER FOR CORN-PLANTERS.

1,108,435.      Specification of Letters Patent.      Patented Aug. 25, 1914.

Application filed May 18, 1912. Serial No. 698,101.

*To all whom it may concern:*

Be it known that I, KARL L. HANSON, a citizen of the United States, residing at Herman, in the county of Washington and State of Nebraska, have invented certain new and useful Improvements in Furrow-Openers for Corn-Planters, of which the following is a specification.

This invention relates to improvements in furrow openers for corn planters, and has for its object to provide a furrow opener which may be attached to an ordinary corn or other seed planters.

With the above and other objects in view I have invented the device described in the following specification, and illustrated in the accompanying drawings in which—

Figure 1:
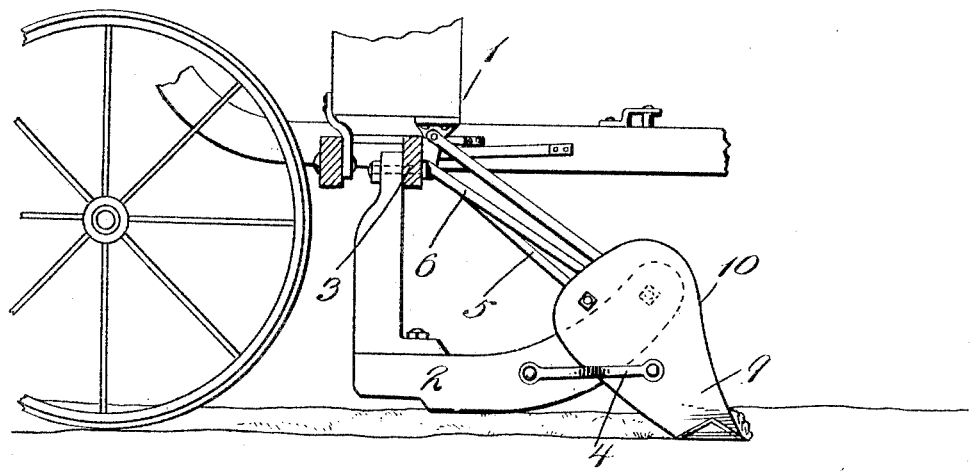
Figures 2, 3:
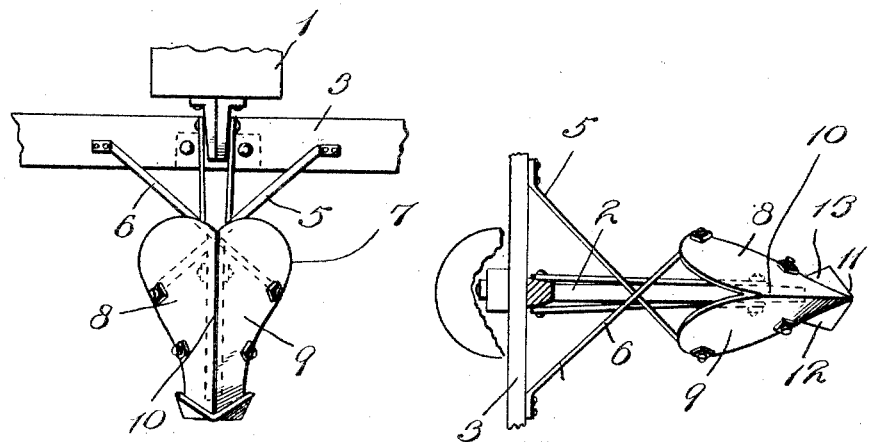

Figure 1 is a side elevational view of my device shown attached to a planter. Fig. 2 is a front elevation thereof and Fig. 3 is a plan view thereof.

Like references indicate like parts throughout the specification and in the several views in the drawings and 1 indicates a planter frame having a furrow shoe and a frame member 3 mounted on the toe of the shoe 2 by means of connecting rods 4 and braced to the member 3 by the brace rods 5 and 6 is a furrow turner 7 consisting of a pair of right and left mold boards 8 and 9 which meet at a central line 10 then form a point 11 from each side of which extend a pair of angularly disposed wings 12 and 13 which form cutters to cut the earth loose ahead of the mold boards.

This device may be attached to any suitable planter in well prepared soil making it unnecessary to first lay off the rows with a shovel plow before doing the planting. In unsuitable soil, my improved detachable furrow may be removed and the planter used in the usual way.

Now having described my invention, that which I claim to be new and desire to procure by Letters Patent is—

1. A furrow shoe, a frame member mounted on the toe thereof, means for bracing said frame member, a furrow turner braced by said bracing means and comprising right and left moldboards meeting at a central line to form a point, and angularly disposed wings extending from said point to form cutters.

2. In a device such as described, the combination with a frame, of a furrow shoe carried by the frame, a furrow turner mounted upon the furrow shoe, braces connecting the furrow turner and the furrow shoe, braces connecting the furrow turner with the frame, and angularly disposed cutting wings extending from the furrow turner.

In testimony whereof I affix my signature in presence of two witnesses.

KARL L. HANSON.

Witnesses:
E. P. HANSON,
R. L. WEST.

Copies of this patent may be obtained for five cents each, by addressing the "Commissioner of Patents, Washington, D. C."